US012075415B2

(12) United States Patent
Van Phan et al.

(10) Patent No.: US 12,075,415 B2
(45) Date of Patent: Aug. 27, 2024

(54) SIDELINK AIDED SCALABLE INITIAL ACCESS FOR MASSIVE IIOT SUPPORT

(71) Applicant: Nokia Technologies Oy, Espoo (FI)

(72) Inventors: Vinh Van Phan, Oulu (FI); Ling Yu, Kauniainen (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 429 days.

(21) Appl. No.: 17/625,269

(22) PCT Filed: Jul. 10, 2020

(86) PCT No.: PCT/US2020/041608
§ 371 (c)(1),
(2) Date: Jan. 6, 2022

(87) PCT Pub. No.: WO2021/007517
PCT Pub. Date: Jan. 14, 2021

(65) Prior Publication Data
US 2022/0287019 A1 Sep. 8, 2022

Related U.S. Application Data

(60) Provisional application No. 62/873,002, filed on Jul. 11, 2019.

(51) Int. Cl.
*H04W 72/20* (2023.01)
*H04W 72/02* (2009.01)
*H04W 74/00* (2009.01)

(52) U.S. Cl.
CPC ........... *H04W 72/20* (2023.01); *H04W 72/02* (2013.01); *H04W 74/002* (2013.01)

(58) Field of Classification Search
CPC .... H04W 72/20; H04W 72/02; H04W 74/002
See application file for complete search history.

(56) References Cited

U.S. PATENT DOCUMENTS 11,889,391 B2 * 1/2024 Shan ................ H04W 12/08
2016/0302250 A1 * 10/2016 Sheng .................. H04W 76/14
(Continued)

FOREIGN PATENT DOCUMENTS

WO 2017/159451 A1 9/2017
WO 2017/220247 A1 12/2017

OTHER PUBLICATIONS

"3rd Generation Partnership Project; Technical Specification Group Services and System Aspects; Feasibility study on 5G message service for MIoT; Stage 1 (Release 16)", 3GPP TR 22.824, V16.0.0, Sep. 2018, pp. 1-27.

(Continued)

*Primary Examiner* — Redentor Pasia
(74) *Attorney, Agent, or Firm* — Robert P. Michal, Esq.; Carter, DeLuca & Farrell LLP

(57) ABSTRACT

According to a first embodiment, a method may include selecting, by a user equipment, at least one sidelink resource from at least one sidelink resource pool configured for initial access to at least one primary serving network entity. The method may further include transmitting, by the user equipment, at least one uplink request for initial access to the at least one primary serving network entity on the selected at least one sidelink resource. The method may further include receiving, by the user equipment, in response to the at least one uplink request, at least one indication from the primary serving network entity.

15 Claims, 8 Drawing Sheets

(56) References Cited

U.S. PATENT DOCUMENTS

| | | | | |
|---|---|---|---|---|
| 2017/0367058 | A1* | 12/2017 | Pelletier | H04W 52/246 |
| 2019/0239112 | A1* | 8/2019 | Rao | H04L 1/08 |
| 2020/0092685 | A1* | 3/2020 | Fehrenbach | H04W 76/14 |
| 2021/0243762 | A1* | 8/2021 | Selvanesan | H04W 72/53 |
| 2021/0266868 | A1* | 8/2021 | Shin | H04W 72/02 |
| 2021/0314917 | A1* | 10/2021 | Lee | H04W 72/02 |
| 2021/0377916 | A1* | 12/2021 | Shi | H04W 24/02 |
| 2022/0007391 | A1* | 1/2022 | Höglund | H04W 72/21 |
| 2022/0038997 | A1* | 2/2022 | Höglund | H04W 48/06 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300, V15.5.0, Mar. 2019, pp. 1-363.

"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321, V15.5.0, Mar. 2019, pp. 1-131.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.5.1, Apr. 2019, pp. 1-948.

"3rd Generation Partnership Project; Technical Specification Group Radio Access Network; NR; NR and NG-RAN Overall Description; Stage 2 (Release 15)", 3GPP TS 38.300, V15.5.0, Mar. 2019, pp. 1-97.

"3rd Generation Partnership Project; Technical Specification Group Radio Access Network; NR; Medium Access Control (MAC) protocol specification (Release 15)", 3GPP TS 38.321, V15.5.0, Mar. 2019, pp. 1-78.

"3rd Generation Partnership Project; Technical Specification Group Radio Access Network; NR; Radio Resource Control (RRC) protocol specification (Release 15)", 3GPP TS 38.331 V15.5.1, Apr. 2019, pp. 1-491.

"Generic Rach Procedure", 1stayTech, Retrieved on Dec. 24, 2021, Webpage available at : https://1stay.wordpress.com/2013/07/31/generic-rach-procedure/.

"5G—Pre Trial—RACH", Share Technote, Retrieved on Dec. 24, 2021, Webpage available at : http://www.sharetechnote.com/html/5G/5G_PreTrial_RACH.html.

International Search Report and Written Opinion received for corresponding Patent Cooperation Treaty Application No. PCT/US2020/041608, dated Sep. 28, 2020, 16 pages.

"On further evolution of eMTC and NB-IoT in Rel-15 LTE", 3GPP TSG RAN Meeting #75, RP-170429, Agenda: 10.1.1, Intel Corporation, Mar. 6-9, 2017, pp. 1-13.

* cited by examiner

SIDELINK AIDED SCALABLE INITIAL ACCESS FOR MASSIVE IIOT SUPPORT

RELATED APPLICATION

This application was originally filed as PCT Application No. PCT/US2020/041608, filed on 10 Jul. 2020, which claims priority from U.S. Provisional Application No. 62/873,002, filed on 11 Jul. 2019. The entire content of the above-referenced application is hereby incorporated by reference.

TECHNICAL FIELD

Some example embodiments may generally relate to mobile or wireless telecommunication systems, such as Long Term Evolution (LTE), fifth generation (5G) radio access technology (RAT), new radio (NR) access technology, and/or other communications systems. For example, certain example embodiments may relate to systems and/or methods for improved sidelink connection establishment procedures.

BACKGROUND

3rd Generation Partnership Project (3GPP) new radio (NR) Release (Rep-17 provides support for massive industrial internet of things (IIoT) systems, which may be used for industrial automation applications requiring a large number of user equipment (UE) devices, sensors, and actuators. Such automation applications may result in ultra-high UE density within a relatively small local service area, such as a factory or other industrial production site. In order to successfully perform their various functions, the multitude of connecting devices may rely on ultra-reliable and low-latency communication (URLLC) over an evolved universal terrestrial radio access network (E-UTRAN) Uu interface, allowing rapid data transfer between UEs and base stations. The base stations of such a system may be dedicated to serve the devices within the massive IIoT system, such as those described in 3GPP technical report (TR) 22.824.

SUMMARY

In accordance with some embodiments, a method may include selecting, by a user equipment, at least one sidelink resource from at least one sidelink resource pool configured for initial access to at least one primary serving network entity. The method may further include transmitting, by the user equipment, at least one uplink request for initial access to the at least one primary serving network entity on the selected at least one sidelink resource. The method may further include receiving, by the user equipment, in response to the at least one uplink request, at least one indication from the primary serving network entity.

In accordance with certain embodiments, an apparatus may include means for selecting at least one sidelink resource from at least one sidelink resource pool configured for initial access to at least one primary serving network entity. The apparatus may further include means for means for transmitting at least one uplink request for initial access to the at least one primary serving network entity on the selected at least one sidelink resource. The apparatus may further include means for means for receiving, in response to the at least one uplink request, at least one indication from the primary serving network entity.

In accordance with various embodiments, an apparatus may include at least one processor and at least one memory including computer program code. The at least one memory and the computer program code may be configured to, with the at least one processor, cause the apparatus to at least select at least one sidelink resource from at least one sidelink resource pool configured for initial access to at least one primary serving network entity. The at least one memory and the computer program code may be further configured to, with the at least one processor, cause the apparatus to at least transmit at least one uplink request for initial access to the at least one primary serving network entity on the selected at least one sidelink resource. The at least one memory and the computer program code may be further configured to, with the at least one processor, cause the apparatus to at least receive, in response to the at least one uplink request, at least one indication from the primary serving network entity.

In accordance with some embodiments, a non-transitory computer readable medium may be encoded with instructions that may, when executed in hardware, perform a method. The method may include selecting, by a user equipment, at least one sidelink resource from at least one sidelink resource pool configured for initial access to at least one primary serving network entity. The method may further include transmitting, by the user equipment, at least one uplink request for initial access to the at least one primary serving network entity on the selected at least one sidelink resource. The method may further include receiving, by the user equipment, in response to the at least one uplink request, at least one indication from the primary serving network entity.

In accordance with certain embodiments, a computer program product may perform a method. The method may include selecting, by a user equipment, at least one sidelink resource from at least one sidelink resource pool configured for initial access to at least one primary serving network entity. The method may further include transmitting, by the user equipment, at least one uplink request for initial access to the at least one primary serving network entity on the selected at least one sidelink resource. The method may further include receiving, by the user equipment, in response to the at least one uplink request, at least one indication from the primary serving network entity.

In accordance with various embodiments, an apparatus may include circuitry configured to select at least one sidelink resource from at least one sidelink resource pool configured for initial access to at least one primary serving network entity. The circuitry may further be configured to transmit at least one uplink request for initial access to the at least one primary serving network entity on the selected at least one sidelink resource. The circuitry may further be configured to receive, in response to the at least one uplink request, at least one indication from the primary serving network entity.

In accordance with some embodiments, a method may include receiving, by a primary serving cell, at least one uplink request message from at least one network entity. The method may further include determining, by the primary serving cell, whether contention is associated with at least one received user equipment identifier on at least one sidelink. The method may further include transmitting, by the primary serving cell, at least one indication to at least one user equipment. The at least one indication may comprise downlink control information via one or more of at least one physical downlink control channel and at least one connection setup message.

In accordance with certain embodiments, an apparatus may include means for receiving at least one uplink request message from at least one network entity. The apparatus may further include means for determining whether contention is associated with at least one received user equipment identifier on at least one sidelink. The apparatus may further include means for means for transmitting at least one indication to at least one user equipment. The at least one indication may comprise downlink control information via one or more of at least one physical downlink control channel and at least one connection setup message.

In accordance with various embodiments, an apparatus may include at least one processor and at least one memory including computer program code. The at least one memory and the computer program code may be configured to, with the at least one processor, cause the apparatus to at least receive at least one uplink request message from at least one network entity. The at least one memory and the computer program code may be further configured to, with the at least one processor, cause the apparatus to at least determine whether contention is associated with at least one received user equipment identifier on at least one sidelink. The at least one memory and the computer program code may be further configured to, with the at least one processor, cause the apparatus to at least transmit at least one indication to at least one user equipment. The at least one indication may comprise downlink control information via one or more of at least one physical downlink control channel and at least one connection setup message.

In accordance with some embodiments, a non-transitory computer readable medium may be encoded with instructions that may, when executed in hardware, perform a method. The method may include receiving, by a primary serving cell, at least one uplink request message from at least one network entity. The method may further include determining, by the primary serving cell, whether contention is associated with at least one received user equipment identifier on at least one sidelink. The method may further include transmitting, by the primary serving cell, at least one indication to at least one user equipment. The at least one indication may comprise downlink control information via one or more of at least one physical downlink control channel and at least one connection setup message.

In accordance with certain embodiments, a computer program product may perform a method. The method may include receiving, by a primary serving cell, at least one uplink request message from at least one network entity. The method may further include determining, by the primary serving cell, whether contention is associated with at least one received user equipment identifier on at least one sidelink. The method may further include transmitting, by the primary serving cell, at least one indication to at least one user equipment. The at least one indication may comprise downlink control information via one or more of at least one physical downlink control channel and at least one connection setup message.

In accordance with various embodiments, an apparatus may include circuitry configured to receive at least one uplink request message from at least one network entity. The circuitry may further be configured to determine whether contention is associated with at least one received user equipment identifier on at least one sidelink. The circuitry may further be configured to transmit at least one indication to at least one user equipment. The at least one indication may comprise downlink control information via one or more of at least one physical downlink control channel and at least one connection setup message.

BRIEF DESCRIPTION OF THE DRAWINGS

For proper understanding of this disclosure, reference should be made to the accompanying drawings, wherein.

DETAILED DESCRIPTION

3GPP technical specifications (TS) 36.300, 36.321, and 36.331 explain that physical random access channel (PRACH) resources may consist of up to 64 preambles per cell. As a result, random access channel (RACH) procedures may be optimized using any of RACH configuration (resource unit allocation) parameters, RACH preamble split (among dedicated, group A, group B) parameters, RACH backoff parameter values, and/or RACH transmission power control parameters.

Similarly, 3GPP TS 38.300, 38.321 and 38.331 define multiple PRACH preamble formats using at least one PRACH orthogonal frequency-division multiplexing (OFDM) symbol, as well as various cyclic prefixes and guard times. PRACH resources may also include different preconfigured PRACH occasions and PRACH preambles per cell.

Figure 1:
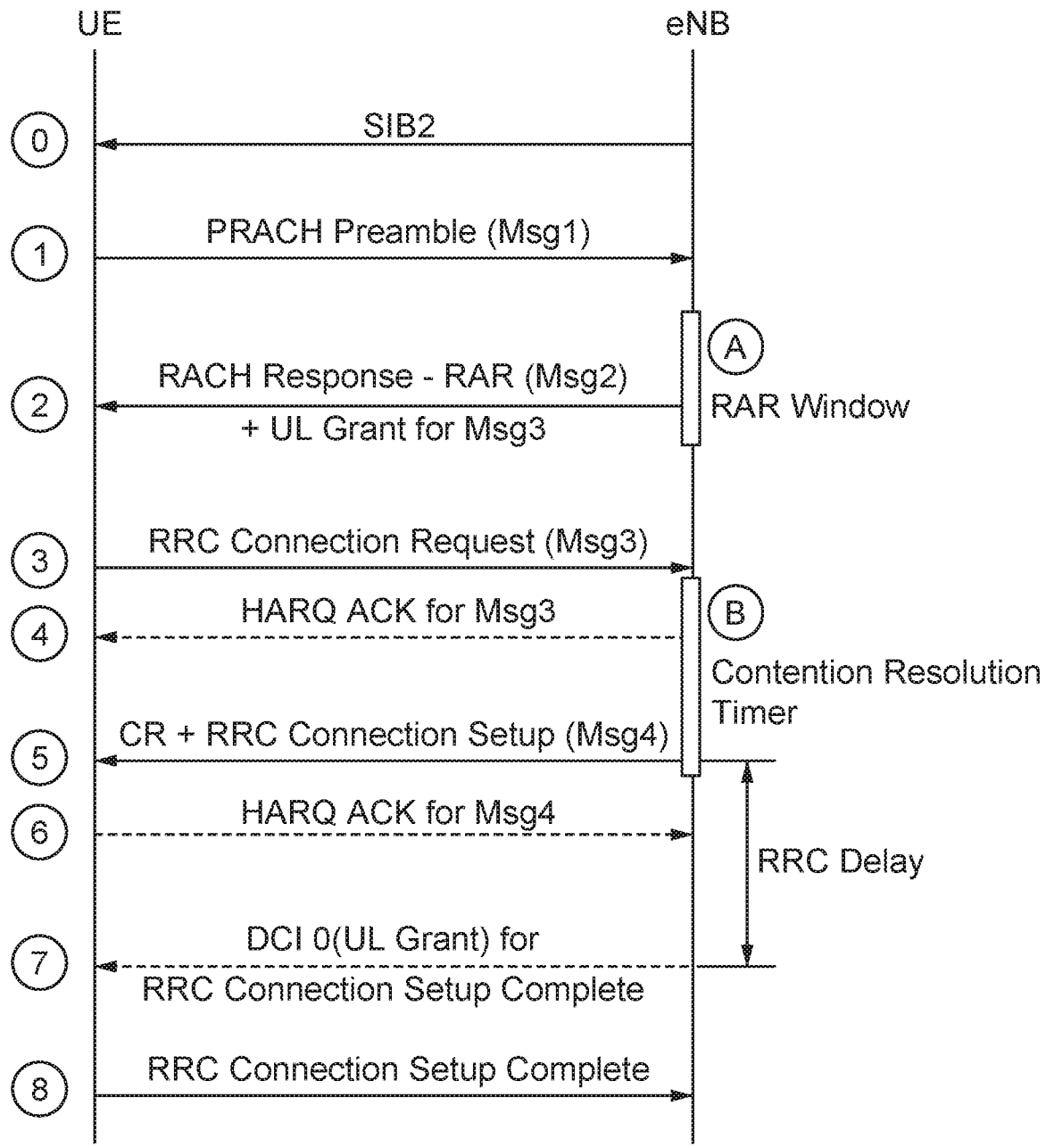
FIG. 1 illustrates an LTE RACH and connection setup procedure for initial access.
Figure 2:
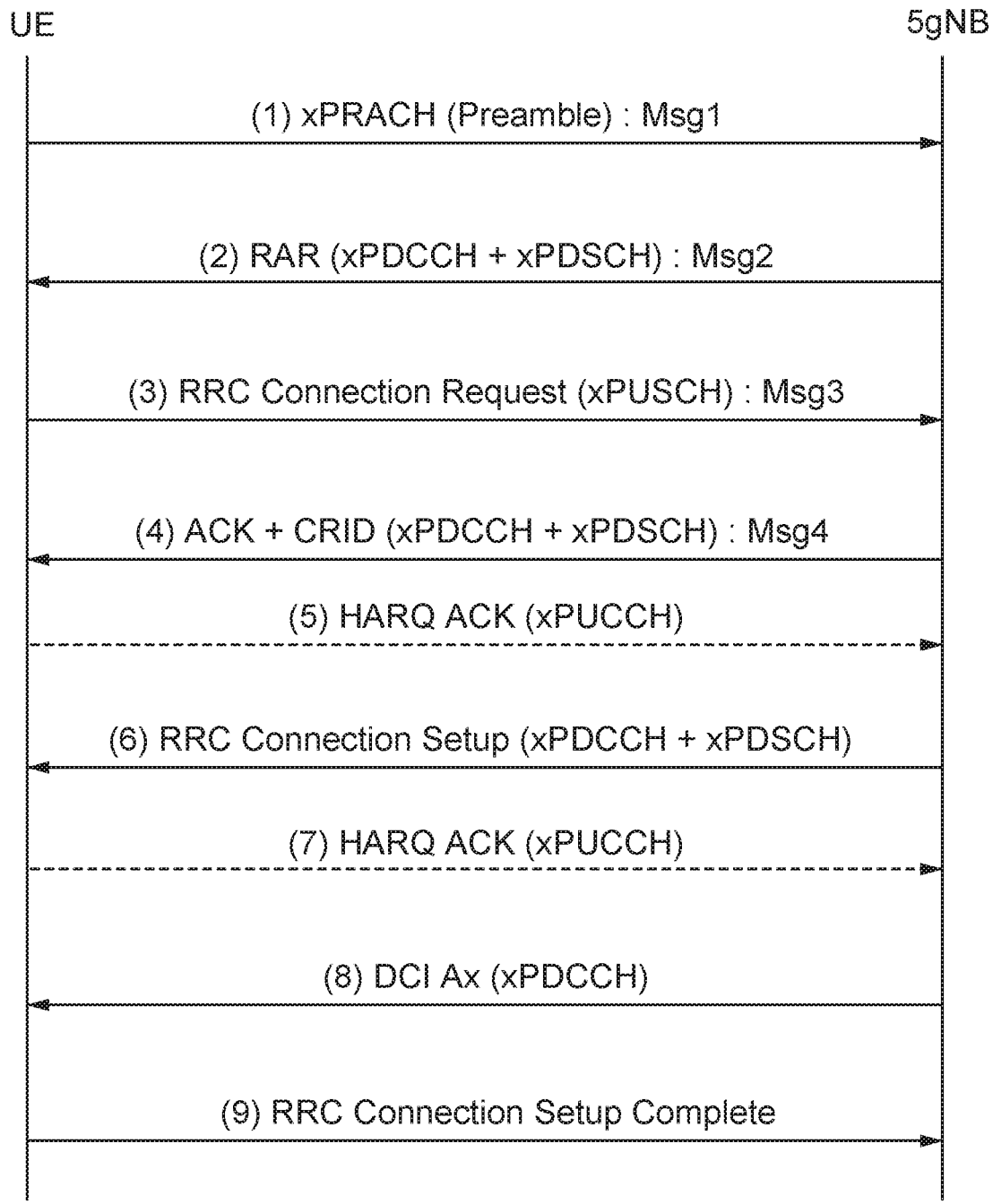
FIG. 2 illustrates an NR RACH and connection setup procedure for initial access.

FIG. 1 shows an example of a RACH procedure for a UE to set up a connection for initial access under LTE, while FIG. 2 illustrates a similar exemplary RACH procedure under NR. The UE may be assigned a dedicated PRACH resource, and may be allowed to have a single active RACH procedure with a medium access control (MAC) entity at any point. This may result in a high latency of the initial access request for transitioning between states using RACH procedures, and may also require configuring the UE to operate at least two MAC entities associated with different carriers.

Due to the ultra-high UE density of a massive IIoT system described above, consideration may be given towards balancing the availability, reliability, latency, capacity, scalability, and power usage within such a system. For example, UE operating within a massive IIoT system may experience improved latency and access performance by constantly remaining in an ACTIVE/CONNECTED state with the serving access network instead of transitioning between INACTIVE/IDLE-TO-ACTIVE/CONNECTED states. However, maintaining continuous network connections may require significant and wasteful signalling and energy usage by the UE.

Conversely, establishing a connection for a UE in a discontinuous reception (DRX) or inactive state having no application activity to preserve energy and network overhead would require the serving network to provide fast and reliable transitions between INACTIVE/IDLE-TO-ACTIVE/CONNECTED states for the high number of UE operating within the massive IIoT system.

3GPP may use a variety of RACH procedures to transition between INACTIVE/IDLE-TO-ACTIVE/CONNECTED states. For example, a UE may transmit a preamble signal or other short message to a serving base station (BS) on a predefined, contention-based physical random access channel (PRACH) configured with predefined, limited resources of a serving cell or carrier. Existing RACH and PRACH procedures are intended to support enhanced mobile broadband (eMBB) services for subscribed UE and/or narrowband IoT (NBIoT), rather than massive IIoT systems having ultra-high UE density and requiring rapid state transitions for URLLC UE. Thus, URLLC support may be unsuitable for massive IIoT systems since UE may not be in a constant ACTIVE/CONNECTED state within the serving network.

Certain embodiments described herein may have various benefits and/or advantages to overcome the disadvantages described above. For example, certain embodiments may enhance and extend RACH and PRACH procedures to enable a serving network to provide fast and scalable INACTIVE/IDLE-TO-ACTIVE/CONNECTED state transitions for the large number of UEs in a massive IIoT system using sidelink connections. The use of SL in a local service area of massive IIoT systems may provide improved flexibility and scalability compared to traditional PRACH and RACH procedures in terms of both resources (e.g., in-band or out-of-band of the serving carrier) and networking functions (e.g., further enhancements over SL).

Furthermore, current broadcast-based SL supports HARQ auto-repetition on the same resource scheduled in SCI or duplication on different resources from corresponding pools on different carriers for enhancing reliability and latency. Furthermore, as broadcast-based SL transmission may be received by more than one local base station, the probability that at least one of the local base stations receive the initial access request of a UE over SL during the first attempt is much higher than using the conventional RACH. This also helps in reassuring availability, reliability and latency for UE of IIoT. Thus, certain embodiments are directed to improvements in computer-related technology.

Figure 3:
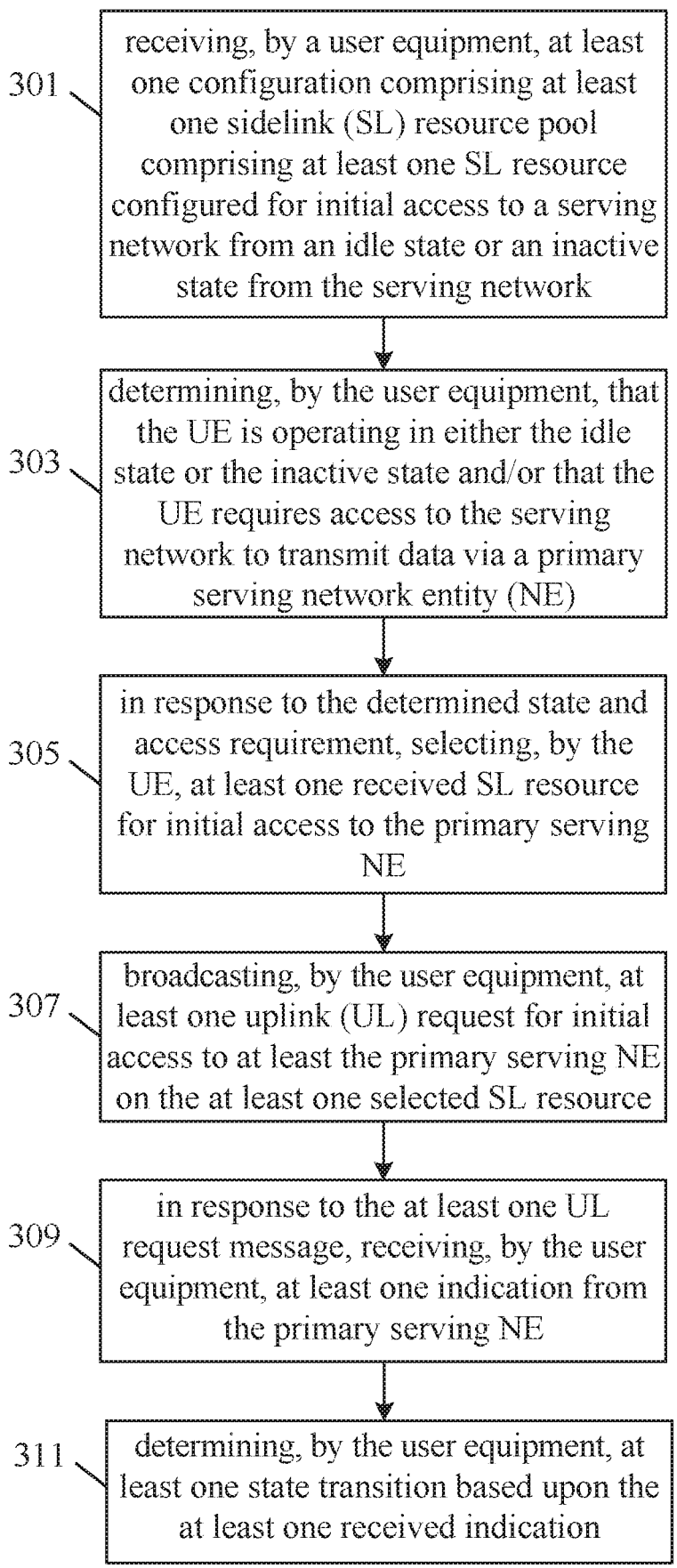
FIG. 3 illustrates an example of a flow diagram of a method that may be performed by a user equipment according to certain embodiments.
Figure 8:
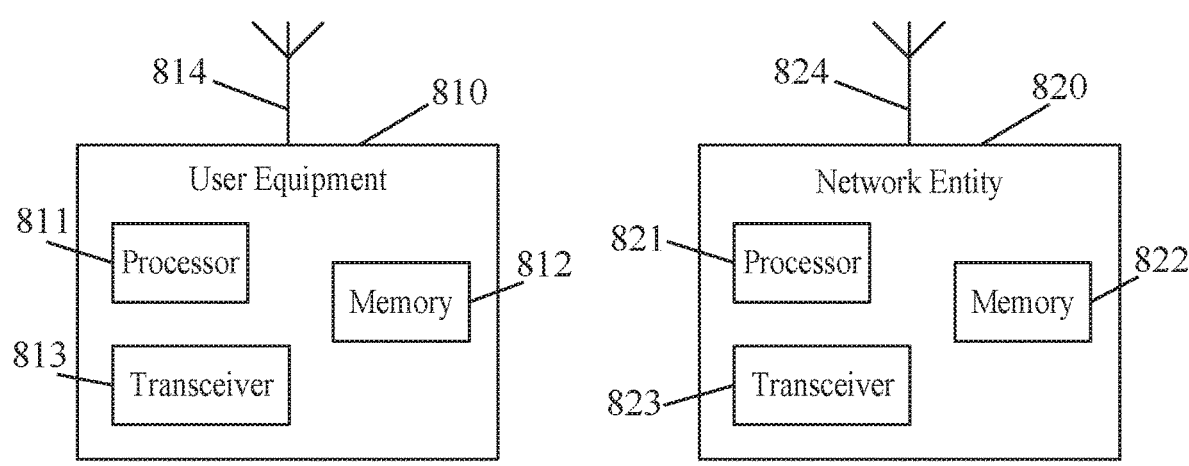
FIG. 8 illustrates an example of a system architecture according to certain embodiments.

FIG. 3 illustrates an example of a flow diagram of a method that may be performed by a user equipment (UE), such as UE 810 illustrated in FIG. 8, according to certain embodiments.

At 301, the UE may receive at least one configuration comprising at least one sidelink (SL) resource pool comprising at least one SL resource configured for initial access to a serving network from an idle state or an inactive state from the serving network. The at least one configuration of the at least one SL resource may comprise at least one indication that at least one SL resource is configured for at least one IIoT device and/or is not configured for non-IIoT devices. Additionally or alternatively, the at least one configuration of at least one SL resource may comprise at least one indication that the at least one SL resource is configured for initial access associated with URLLC support and/or is not configured for MBB support.

In various embodiments, the at least one SL-based option may be used for each UE in an inactive state, and/or RACH may be configured to be used for each UE in an idle state. Alternatively, the at least one SL-based option may be used for each UE in an idle state, and/or RACH may be used for each UE in inactive state. In some embodiments, where the selected primary cell is different from the previous serving cell, and the UE is in an inactive state, the at least one SL-based option may be used instead of RACH procedure.

Furthermore, the at least one SL-based option may be used for each UE associated with at least one predetermined URLLC quality of service (QoS) class instead of, or in addition to, RACH procedure. In addition, the at least one SL-based option may be dynamically triggered by the serving network using at least one indication provided in, for example, at least one system information block (SIB) and/or common L1 signaling in PDCCH. This indication may be sent either together with the at least one configuration at 301 in the same SIB or separately from the at least one configuration in a different SIB and/or a PDCCH instance.

Figure 7:
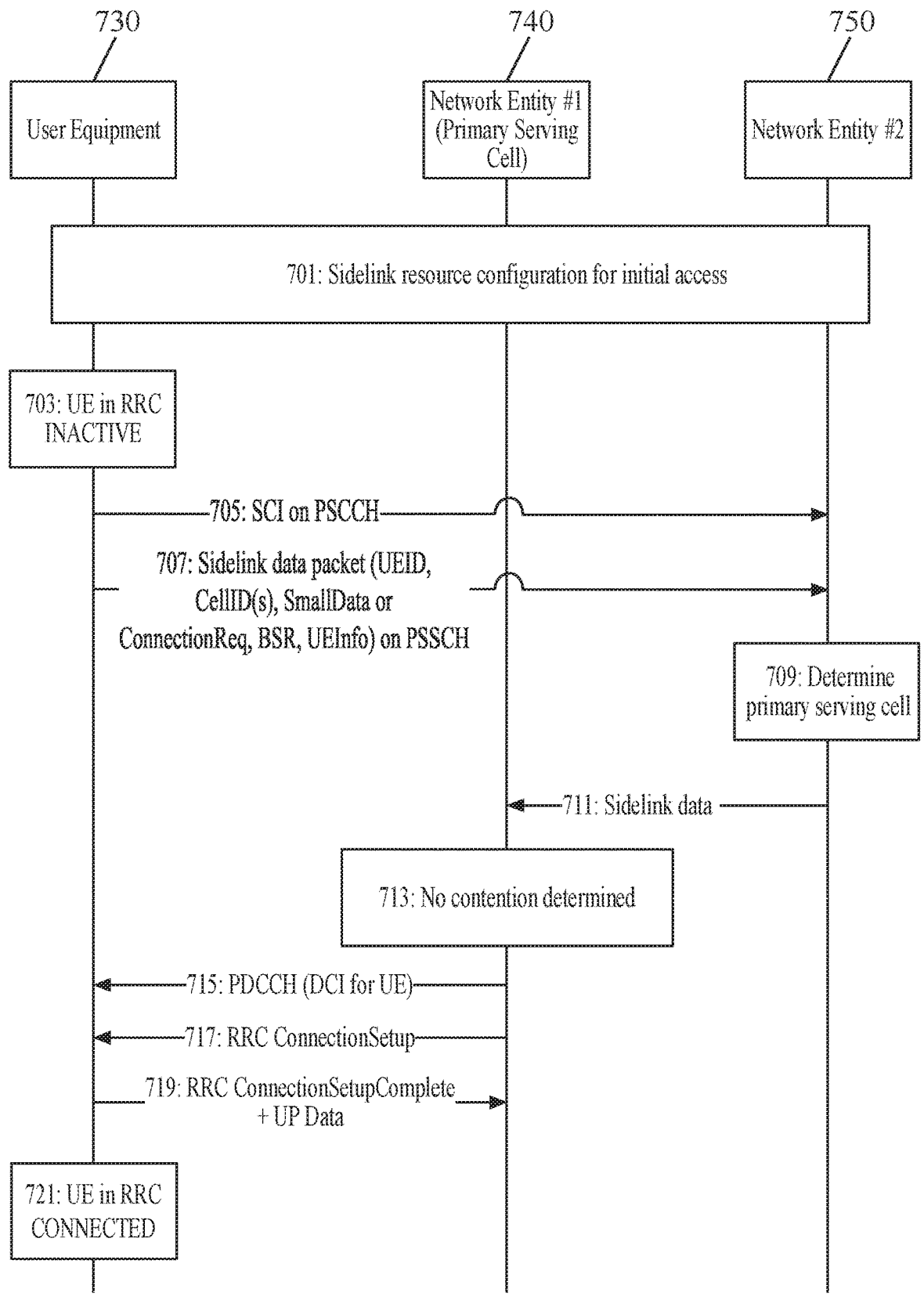
FIG. 7 illustrates another example of a signaling diagram according to certain embodiments.

At 303, the UE may determine that the UE is operating in either the idle state or the inactive state and/or that the UE requires access to the serving network to transmit data via a primary serving network entity (NE), such as NE 720 illustrated in FIG. 7, of the serving network. For example, the UE may determine that the UE is operating in one of an idle state such as NR radio resource control (RRC) IDLE, or an inactive state such as NR RRC INACTIVE.

At 305, in response to the determined state and access requirement, the UE may select at least one received SL resource for initial access to the primary serving NE. In some embodiments, the at least one selected SL resource may be selected based, at least, upon an amount and/or type of data required to be transmitted, and/or at least one quality of service (QoS) requirement associated with the data required to be transmitted. For example, the UE may be configured to select at least one received SL resource where URLLC data is to be transmitted. Alternatively or alternatively, the UE may be configured to select at least one RACH resource where MBB data is to be transmitted.

At 307, the UE may broadcast at least one uplink (UL) request for initial access to at least the primary serving NE on the at least one selected SL resource. In some embodiments, the at least one UL request may be in response to the UE determining that the UE is operating in one of an idle state or an inactive state.

According to certain embodiments, the at least one UL request message may be in form of enhanced SL control information (SCI) broadcast over SL on a physical SL control channel (PSCCH). The enhanced SCI may be configured to obtain an initial access for transition of the UE to a connected state of the serving network. Furthermore, the enhanced SCI may be transmitted via L1 signaling using at least one designated L1 SCI broadcast using at least one PSCCH, such as for transmitting at least one basic initial access request.

In some further embodiments, the enhanced SCI may further comprise at least one UE identification (ID). For example, the at least one UE ID may be either a UE-generated, random UE ID if the UE is in RRC_IDLE, or a network-assigned inactive-radio network temporary identifier (I-RNTI) if the UE is in RRC_INACTIVE.

In various embodiments, where the enhanced SCI is within at least one SCI size threshold, such as 100 bits, transmitting the enhanced SCI may be faster than transmitting the at least one UL request message based on various other configurations, such as those discussed below.

In certain embodiments, the at least one UL request message may comprise SCI transmitted via PSCCH and at least one SL data packet transmitted via PSSCH. The SCI transmitted via PSCCH may be a L1 control signaling configured to schedule the at least one SL data packet transmitted via PSSCH. The at least one SL data packet may comprise at least one extended initial access request transmitted as L2 and/or L3 signaling.

In certain embodiments, the at least one SL data packet as for the at least one extended initial access request may comprise one or more of at least one connection request, at least one buffer status report (BSR), and UE assistant information.

In some embodiments, the at least one UL request message may further comprise at least one UE identification (ID). For example, the at least one UE ID may be either a UE-generated, random UE ID if the UE is in RRC_IDLE, or a network-assigned inactive-radio network temporary identifier (I-RNTI) if the UE is in RRC_INACTIVE.

In certain embodiments, the length of the at least one I-RNTI may comprise a predetermined number of bits, such as 40-bits, as described by 3GPP TS 38.300. Additionally or alternatively, the at least one I-RNTI may comprise at least one UE-specific part, such as cell-RNTI (C-RNTI) which may also be applied for LTE, as described by 3GPP TS 36.300, and/or at least one RAN node-specific part, such as at least one ID of at least one current serving cell and/or at least one previous serving cell associated with an inactive UE state. In some embodiments, the at least one UE-generated, random UE ID may only be applied to the at least one UE-specific part, and/or the at least one RAN node-specific part may be based on at least one broadcast ID associated with at least one selected serving cell.

In some embodiments, the at least one UL request message may comprise at least one unique non-access stratum (NAS)-level ID, such as at least one globally unique temporary identifier (GUTI), at least one temporary mobile subscriber identity (TMSI), and/or at least one international mobile subscriber identity (IMSI), which may be configured to fit in the at least one UL request message. In various embodiments, the at least one UL request message may comprise a predetermined number of bits, such as 8 least significant bits (LSB) of at least one destination ID sent in SCI via PSCCH to schedule a SL transmission for the at least one destination ID of at least one receiving UE via PSSCH in general as described by 3GPP TS 36.300, which may not be used by the at least one SL transmission of the at least one UL request message. This is because the destination of the at least one UL request message may be the primary serving NE. Thus, the 8 LSB of the at least one destination ID may be replaced with other control information, such as at least part of the UE ID, as described above.

In certain embodiments, the at least one UL request message may further comprise at least one indication of the determined state of the UE, such as idle state and/or inactive state. Additionally or alternatively, the at least one UL request message may comprise at least one indication of at least one ID of at least one primary serving cell selected by the UE. For example, the at least one UL request message, when transmitted on at least one broadcast SL, may be received by multiple local base stations serving the massive IIoT system, wherein at least one SL resource may be coordinated between the multiple local base stations as part of that at least one preconfigured resource pool. As a result, this coordination may allow other than the selected primary serving cell in addition to the selected primary serving cell to receive the at least one UL request message broadcasted over SL and may forward the received at least one UL request message to the selected primary serving cell, as indicated in the at least one UL request message. This may improve the reliability and latency of the at least one UL request message. Depending on context awareness of the massive IIoT system being served, such as the number of UEs in different RRC states of the serving network, the serving network (via local BS or NE) may re-configure a proper SL resource pool for the SL-based option. SL resources may be in-band or out-of-band with regard to the serving Uu carrier. Both Tx and Rx pools for SL may be configured as cell or BS specific, for example, in case there is no coordination among local BSs. In this case, these pools may be the same and there may be no need to indicate the selected primary serving cell in the initial access request.

In contrast to transmitting the at least one UL request message based on enhanced SCI, as described above, transmitting the at least one UL request message comprising SCI and at least one SL data packet may enable transmission of additional information in the at least one UL request message without affecting the latency of the state transition. Additionally or alternatively, transmitting the at least one UL request message comprising SCI and at least one SL data packet may provide additional flexibility and/or efficiency inherited from the possibility of fully utilizing SL capability, as explained further below.

Furthermore, where the at least one UL request message comprises SCI and at least one SL data packet, the UE may broadcast the at least one UL request message consisting of at least one actual application message (for example, small-data application) without requesting a state transition to RRC CONNECTED. This may be advantageous for data applications merely needing infrequent connections for transmitting considerable amount of data within the massive IIoT by eliminating the transmission of a connection request and the need of a connection setup each time the UE needs to transmit a small data from the idle state or the inactive state.

At 309, in response to the at least one UL request message, the UE may receive at least one indication from the primary serving NE. In some embodiments, the at least one indication may comprise downlink control information (DCI) via the at least one physical downlink control channel (PDCCH) and/or at least one connection setup message, such as RRC CONNECTION SETUP. In some embodiments, the at least one indication may comprise at least one schedule grant for the UE to receive and/or transmit subsequent data and/or at least one message, which may indicate to the UE that a state transition is required. Furthermore, the at least one indication may comprise at least one acknowledgement of small data, which may indicate to the UE that no state transition is required. At 311, the UE may determine at least one state transition based upon the at least one received indication.

Figure 4:
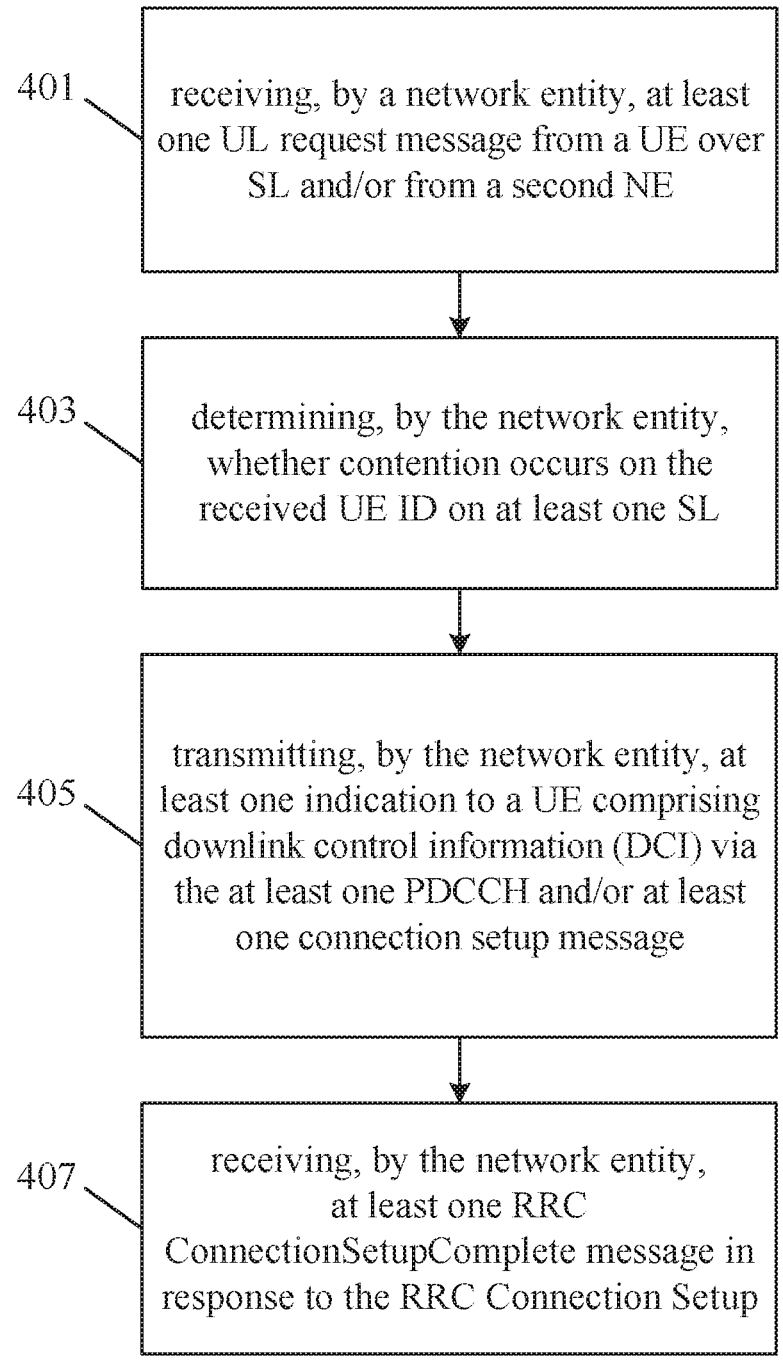
FIG. 4 illustrates an example of a flow diagram of a method that may be performed by a network entity according to certain embodiments.

FIG. 4 illustrates an example of a flow diagram of a method that may be performed by a NE, such as NE 820 illustrated in FIG. 8, according to certain embodiments. At 401, the NE may receive at least one UL request message from a UE, such as UE 810 in FIG. 8, over SL and/or from a second NE, such as NE 820 illustrated in FIG. 8. The latter may indicate that the second NE received the at least one UL request message from the UE over SL and forwarded the at least one UL request message to the first NE via a network interface between the NEs.

According to certain embodiments, the at least one UL request message may be in form of enhanced SCI configured to obtain an initial access for transition of the UE to a connected state of the serving network.

In some further embodiments, the enhanced SCI may further comprise at least one UE identification (ID). For example, the at least one UE ID may be either a UE-generated, random UE ID if the UE is in RRC_IDLE, or a network-assigned inactive-radio network temporary identifier (I-RNTI) if the UE is in RRC_INACTIVE.

In various embodiments, where the enhanced SCI is within at least one SCI size threshold, such as 100 bits, transmitting the enhanced SCI may be faster than transmitting the at least one UL request message based on various other configurations, such as those discussed below.

In certain embodiments, the at least one UL request message may comprise SCI transmitted via PSCCH and at least one SL data packet transmitted via PSSCH. The SCI transmitted via PSCCH may be a L1 control signaling configured to schedule the at least one SL data packet transmitted via PSSCH. The at least one SL data packet may comprise at least one extended initial access request transmitted as L2 and/or L3 signaling.

In certain embodiments, the at least one SL data packet as for the at least one extended initial access request may comprise one or more of at least one connection request, at least one buffer status report (BSR), and UE assistant information.

In some embodiments, the at least one UL request message may further comprise at least one UE identification (ID). For example, the at least one UE ID may be either a UE-generated, random UE ID if the UE is in RRC_IDLE, or a network-assigned inactive-radio network temporary identifier (I-RNTI) if the UE is in RRC_INACTIVE.

In certain embodiments, the length of the at least one I-RNTI may comprise a predetermined number of bits, such as 40-bits, as described by 3GPP TS 38.300. Additionally or alternatively, the at least one I-RNTI may comprise at least one UE-specific part, such as cell-RNTI (C-RNTI) which may also be applied for LTE, as described by 3GPP TS 36.300, and/or at least one RAN node-specific part, such as at least one ID of at least one current serving cell and/or at least one previous serving cell associated with an inactive UE state. In some embodiments, the at least one UE-generated, random UE ID may only be applied to the at least one UE-specific part, and/or the at least one RAN node-specific part may be based on at least one broadcast ID associated with at least one selected serving cell.

In some embodiments, the at least one UL request message may comprise at least one unique non-access stratum (NAS)-level ID, such as at least one globally unique temporary identifier (GUTI), at least one temporary mobile subscriber identity (TMSI), and/or at least one international mobile subscriber identity (IMSI), which may be configured to fit in the at least one UL request message. In various embodiments, the at least one UL request message may comprise a predetermined number of bits, such as 8 least significant bits (LSB) of at least one destination ID sent in SCI via PSCCH to schedule a SL transmission for the at least one destination ID of at least one receiving UE via PSSCH in general as described by 3GPP TS 36.300, which may not be used by the at least one SL transmission of the at least one UL request message. This is because the destination of the at least one UL request message may be the primary serving NE. Thus, the 8 LSB of the at least one destination ID may be replaced with other control information, such as at least part of the UE ID, as described above.

In certain embodiments, the at least one UL request message may further comprise at least one indication of the determined state of the UE, such as idle state and/or inactive state. Additionally or alternatively, the at least one UL request message may comprise at least one indication of at least one ID of at least one primary serving cell selected by the UE. For example, the at least one UL request message, when transmitted on at least one broadcast SL, may be received by multiple local base stations serving the massive IIoT system, wherein at least one SL resource may be coordinated between the multiple local base stations as part of that at least one preconfigured resource pool. As a result, this coordination may allow other than the selected primary serving cell in addition to the selected primary serving cell to receive the at least one UL request message broadcasted over SL and may forward the received at least one UL request message to the selected primary serving cell, as indicated in the at least one UL request message. This may improve the reliability and latency of the at least one UL request message. Depending on context awareness of the massive IIoT system being served, such as the number of UEs in different RRC states of the serving network, the serving network (via local BS or NE) may re-configure a proper SL resource pool for the SL-based option. SL resources may be in-band or out-of-band with regard to the serving Uu carrier. Both Tx and Rx pools for SL may be configured as cell or BS specific, for example, in case there is no coordination among local BSs. In this case, these pools may be the same and there may be no need to indicate the selected primary serving cell in the initial access request.

In contrast to transmitting the at least one UL request message based on enhanced SCI, as described above, transmitting the at least one UL request message comprising SCI and at least one SL data packet may enable transmission of additional information in the at least one UL request message without affecting the latency of the state transition. Additionally or alternatively, transmitting the at least one UL request message comprising SCI and at least one SL data packet may provide additional flexibility and efficiency inherited from the possibility of fully utilizing SL capability, as explained further below.

Furthermore, where the at least one UL request message comprises SCI and at least one SL data packet, the UE may broadcast the at least one UL request message consisting of at least one actual application message (for example, small-data application) without requesting a state transition to RRC CONNECTED. This may be advantageous for data applications merely needing infrequent connections for transmitting considerable amount of data within the massive IIoT by eliminating the transmission of a connection request and the need of a connection setup each time the UE needs to transmit a small data from the idle state or the inactive state.

At 403, the NE may determine whether contention occurs on the received UE ID on at least one SL, which may be based upon the at least one UE-generated random ID or the at least one network-assigned I-RNTI. Upon determining that no contention occurs, the NE may schedule the UE on at least one PDCCH with the received UE ID, such as the at least one UE-generated random ID or the at least one I-RNTI, for proceeding with the received UL request without a contention resolution. Upon determining that contention occurs, the NE may schedule the UE on at least one PDCCH with the received UE ID, such as the at least one UE-generated random ID or the at least one I-RNTI, either for proceeding with the received UL request with a contention resolution or for contention resolution. The former is applied when the contention occurs on the received UE ID between the received UE ID of the UE on SL and the UE ID of another UE which is being served by the NE. The former is also applied when the contention occurs on the received UE ID between different UEs on SL which can be uniquely distinguished or identified by other elements or UE IDs (than the received UE ID) indicated in the corresponding UL requests of different UEs received by the NE on SL. The latter is applied otherwise, as the NE is not able to distinguish different UEs involved in the contention right away and therefore UEs involved the contention may need to resend the UL request.

At 405, the NE may transmit at least one indication to a UE, such as UE 810 in FIG. 8. In some embodiments, the at least one indication may comprise downlink control information (DCI) via the at least one PDCCH and/or at least one connection setup message, such as RRC CONNECTION SETUP. In some embodiments, the at least one indication may comprise at least one schedule grant for the UE to receive and/or transmit subsequent data and/or at least one message, which may indicate to the UE that a state transition is required. Furthermore, the at least one indication may comprise at least one acknowledgement of small data, which may indicate to the UE that no state transition is required. In some embodiments, for contention resolution, the at least one indication may comprise at least one indication that a contention occurs, and/or whether the contention is resolved for the UE to proceed with the UL request right away or the UE needs to resend the UL request. At 407, the NE may receive at least one RRC ConnectionSetupComplete message in response to the RRC Connection Setup.

Figure 5:
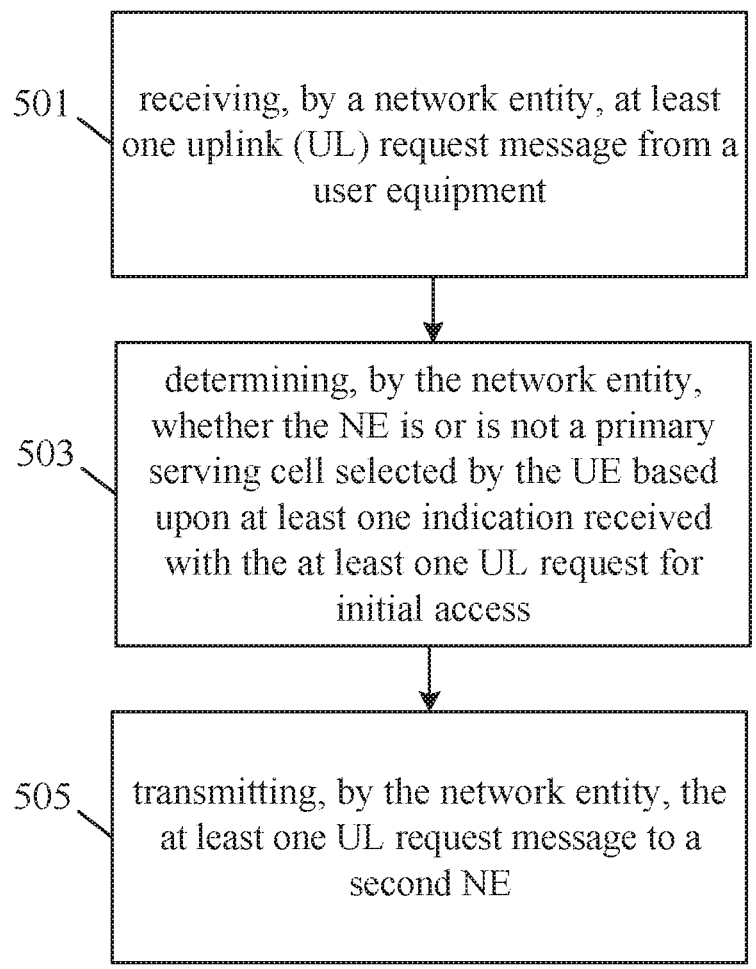
FIG. 5 illustrates another example of a flow diagram of a method that may be performed by a network entity according to certain embodiments.

FIG. 5 illustrates an example of a flow diagram of a method that may be performed by a NE, such as NE 820 illustrated in FIG. 8, according to certain embodiments. At 501, the NE may receive at least one UL request for initial access from a UE, such as UE 810 in FIG. 8, on at least one selected SL resource. In some embodiments, the at least one UL request may be in response to the UE determining that the UE is operating in one of an idle state or an inactive state.

According to certain embodiments, the at least one UL request message may be in form of enhanced SL control information (SCI) broadcast over SL on a physical SL control channel (PSCCH). The enhanced SCI may be configured to obtain an initial access for transition of the UE to a connected state of the serving network. Furthermore, the enhanced SCI may be transmitted via L1 signaling using at least one designated L1 SCI broadcast using at least one PSCCH, such as for transmitting at least one basic initial access request.

In some further embodiments, the enhanced SCI may further comprise at least one UE identification (ID). For example, the at least one UE ID may be either a UE-generated, random UE ID if the UE is in RRC_IDLE, or a network-assigned inactive-radio network temporary identifier (I-RNTI) if the UE is in RRC_INACTIVE.

In various embodiments, where the enhanced SCI is within at least one SCI size threshold, such as 100 bits, transmitting the enhanced SCI may be faster than transmitting the at least one UL request message based on various other configurations, such as those discussed below.

In certain embodiments, the at least one UL request message may comprise SCI transmitted via PSCCH and at least one SL data packet transmitted via PSSCH. The SCI transmitted via PSCCH may be a L1 control signaling configured to schedule the at least one SL data packet transmitted via PSSCH. The at least one SL data packet may comprise at least one extended initial access request transmitted as L2 and/or L3 signaling.

In certain embodiments, the at least one SL data packet as for the at least one extended initial access request may comprise one or more of at least one connection request, at least one buffer status report (BSR), and UE assistant information.

In some embodiments, the at least one UL request message may further comprise at least one UE identification (ID). For example, the at least one UE ID may be either a UE-generated, random UE ID if the UE is in RRC_IDLE, or a network-assigned inactive-radio network temporary identifier (I-RNTI) if the UE is in RRC_INACTIVE.

In certain embodiments, the length of the at least one I-RNTI may comprise a predetermined number of bits, such as 40-bits, as described by 3GPP TS 38.300. Additionally or alternatively, the at least one I-RNTI may comprise at least one UE-specific part, such as cell-RNTI (C-RNTI) which may also be applied for LTE, as described by 3GPP TS 36.300, and/or at least one RAN node-specific part, such as at least one ID of at least one current serving cell and/or at least one previous serving cell associated with an inactive UE state. In some embodiments, the at least one UE-generated, random UE ID may only be applied to the at least one UE-specific part, and/or the at least one RAN node-specific part may be based on at least one broadcast ID associated with at least one selected serving cell.

In some embodiments, the at least one UL request message may comprise at least one unique non-access stratum (NAS)-level ID, such as at least one globally unique temporary identifier (GUTI), at least one temporary mobile subscriber identity (TMSI), and/or at least one international mobile subscriber identity (IMSI), which may be configured to fit in the at least one UL request message. In various embodiments, the at least one UL request message may comprise a predetermined number of bits, such as 8 least significant bits (LSB) of at least one destination ID sent in SCI via PSCCH to schedule a SL transmission for the at least one destination ID of at least one receiving UE via PSSCH in general as described by 3GPP TS 36.300, which may not be used by the at least one SL transmission of the at least one UL request message. This is because the destination of the at least one UL request message may be the primary serving NE. Thus, the 8 LSB of the at least one destination ID may be replaced with other control information, such as at least part of the UE ID, as described above.

In certain embodiments, the at least one UL request message may further comprise at least one indication of the determined state of the UE, such as idle state and/or inactive state. Additionally or alternatively, the at least one UL request message may comprise at least one indication of at least one ID of at least one primary serving cell selected by the UE. For example, the at least one UL request message, when transmitted on at least one broadcast SL, may be received by multiple local base stations serving the massive IIoT system, wherein at least one SL resource may be coordinated between the multiple local base stations as part of that at least one preconfigured resource pool. As a result, this coordination may allow other than the selected primary serving cell in addition to the selected primary serving cell to receive the at least one UL request message broadcasted over SL and may forward the received at least one UL request message to the selected primary serving cell, as indicated in the at least one UL request message. This may improve the reliability and latency of the at least one UL request message. Depending on context awareness of the massive IIoT system being served, such as the number of UEs in different RRC states of the serving network, the serving network (via local BS or NE) may re-configure a proper SL resource pool for the SL-based option. SL resources may be in-band or out-of-band with regard to the serving Uu carrier. Both Tx and Rx pools for SL may be configured as cell or BS specific, for example, in case there is no coordination among local BSs. In this case, these pools may be the same and there may be no need to indicate the selected primary serving cell in the initial access request.

In contrast to transmitting the at least one UL request message based on enhanced SCI, as described above, transmitting the at least one UL request message comprising SCI and at least one SL data packet may enable transmission of additional information in the at least one UL request message without affecting the latency of the state transition. Additionally or alternatively, transmitting the at least one UL request message comprising SCI and at least one SL data packet may provide additional flexibility and/or efficiency inherited from the possibility of fully utilizing SL capability, as explained further below.

Furthermore, where the at least one UL request message comprises SCI and at least one SL data packet, the UE may broadcast the at least one UL request message consisting of at least one actual application message (for example, small-data application) without requesting a state transition to RRC CONNECTED. This may be advantageous for data applications merely needing infrequent connections for transmitting considerable amount of data within the massive IIoT by eliminating the transmission of a connection request and the need of a connection setup each time the UE needs to transmit a small data from the idle state or the inactive state.

In step 503, the NE may determine whether the NE is or is not a primary serving cell selected by the UE based upon at least one indication received with the at least one UL request for initial access. If the NE determines that the NE is not a primary serving cell selected by the UE based upon at least one indication received with the at least one UL request for initial access, then at 505, the network entity may transmit the at least one UL request message to a second NE, such as NE 820 illustrated in FIG. 8.

Figure 6:
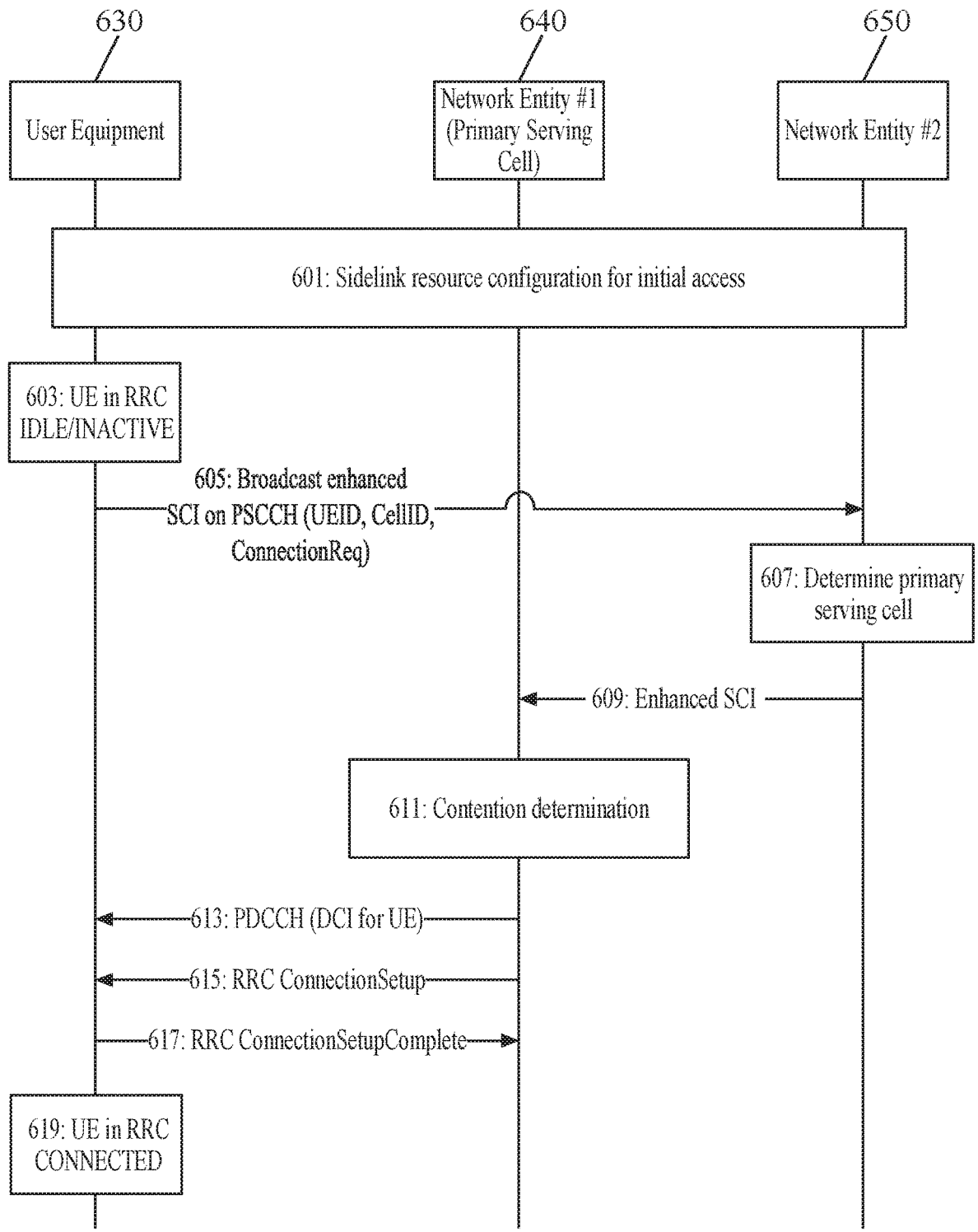
FIG. 6 illustrates an example of a signaling diagram according to certain embodiments.

FIG. 6 illustrates an example of a signaling diagram showing communications between UE 630, NE 640, and NE 650. UE 630 may be similar to UE 810, and NE 640 and NE 650 may be similar to NE 820, both illustrated in FIG. 8.

In 601, UE 630, NE 640, and NE 650 may be configured with at least one sidelink (SL) resource pool configured for initial access to a serving network from an idle state or an inactive state from the serving network. In some embodiments, the at least one SL resource pool may comprise at least one resource configured for SL transmissions. Additionally or alternatively, the at least one configuration of the at least one SL resource may comprise at least one indication that at least one SL resource is configured for at least one IIoT device and/or is not configured for non-IIoT devices. Additionally or alternatively, the at least one configuration of at least one SL resource may comprise at least one indication that the at least one SL resource is configured for initial access associated with URLLC support and/or is not configured for MBB support.

In various embodiments, the at least one SL-based option may be used for each UE in an inactive state, and/or RACH may be configured to be used for each UE in an idle state. Alternatively, the at least one SL-based option may be used for each UE in an idle state, and/or RACH may be used for each UE in inactive state. In some embodiments, where the selected primary cell is different from the previous serving cell, and the UE is in an inactive state, the at least one SL-based option may be used instead of RACH procedure.

Furthermore, the at least one SL-based option may be used for each UE associated with at least one predetermined URLLC quality of service (QoS) class instead of, or in addition to, RACH procedure. In addition, the at least one SL-based option may be dynamically triggered by the serving network using at least one indication provided in, for example, at least one system information block (SIB) and/or common L1 signaling in PDCCH. At 309, the UE may transition to at least one connected state.

In 603, UE 630 may determine that UE 630 is operating in either the idle state or the inactive state and/or that UE 630 requires access to the serving network to transmit data to NE 640. For example, UE 630 may determine that UE 630 is operating in one of an idle state such as NR radio resource control (RRC) IDLE, or an inactive state such as NR RRC INACTIVE. In response to the determined state and access requirement, UE 630 may select at least one received SL resource for initial access to NE 640. In some embodiments, the at least one selected SL resource may be selected based, at least, upon an amount and/or type of data required to be transmitted, and/or at least one quality of service (QoS) requirement associated with the data required to be transmitted. For example, UE 630 may be configured to select at least one received SL resource where URLLC data is to be transmitted. Alternatively or alternatively, UE 630 may be configured to select at least one RACH resource where MBB data is to be transmitted.

In addition, UE 630 may broadcast the at least one uplink (UL) request over SL using the at least one selected SL resource for initial access. The example illustrated in FIG. 6 shows that the at least one UL request may be received by at least one NE 650 on the at least one selected SL resource. In some embodiments, the at least one UL request may be in response to UE 630 determining that UE 630 is operating in one of an idle state or an inactive state.

According to certain embodiments, the at least one UL request message may be in form of enhanced SCI broadcast over SL on a PSCCH. The enhanced SCI may be configured to obtain an initial access for transition of UE 630 to a connected state of the serving network. Furthermore, the enhanced SCI may be transmitted via L1 signaling using at least one designated L1 SCI broadcast using at least one PSCCH, such as for transmitting at least one basic initial access request.

In some further embodiments, the enhanced SCI may further comprise at least one UE ID. For example, the at least one UE ID may be either a UE-generated, random UE ID if the UE is in RRC_IDLE, or a network-assigned inactive-radio network temporary identifier (I-RNTI) if the UE is in RRC_INACTIVE.

At 605, NE 650 may receive the at least one UL request message from NE 640. At 607, NE 650 may determine whether NE 650 is or is not a primary serving cell selected by UE 630 based upon at least one indication received with the at least one UL request for initial access. If NE 650 determines that NE 650 is not a primary serving cell selected by UE 630 based upon at least one indication received with the at least one UL request for initial access, at 609, NE 650 may transmit the at least one UL request message to NE 640 which is identified by NE 650 as the selected primary serving cell of UE 630 based upon at least one indication received with the at least one UL request for initial access.

At 611, NE 640 may determine whether contention occurs on the received UE ID on at least one SL, which may be based upon the at least one I-RNTI. Furthermore, upon determining that no contention occurs, NE 640 may schedule UE 630 on at least one PDCCH with the received UE ID, such as the at least one I-RNTI.

At 613 and 615, NE 640 may transmit at least one indication to UE 630. In some embodiments, the at least one indication may comprise downlink control information (DCI) via the at least one PDCCH (613) and/or at least one connection setup message, such as RRC CONNECTION SETUP (615). Furthermore, the at least one indication may comprise at least one acknowledgement of small data, which may indicate to the UE that no state transition is required. At 617, NE 640 may receive at least one RRC ConnectionSetupComplete message from UE 630 in response to the RRC Connection Setup. At 619, UE 630 may determine at least one state transition based upon the at least one received indication.

FIG. 7 illustrates an example of a signaling diagram showing communications between UE 730, NE 740, and NE 750. UE 730 may be similar to UE 810, and NE 740 and NE 750 may be similar to NE 820, both illustrated in FIG. 8. The following SL-based procedure may also be applied for radio link failure (RLF) recovery of UE as well.

In 701, UE 730, NE 740, and NE 750 may be configured with at least one sidelink (SL) resource pool configured for initial access to a serving network from an idle state or an inactive state from the serving network. In some embodiments, the at least one SL resource pool may comprise at least one resource configured for SL transmissions. Additionally or alternatively, the at least one configuration of the at least one SL resource may comprise at least one indication that at least one SL resource is configured for at least one IIoT device and/or is not configured for non-IIoT devices. Additionally or alternatively, the at least one configuration of at least one SL resource may comprise at least one indication that the at least one SL resource is configured for initial access associated with URLLC support and/or is not configured for MBB support.

In various embodiments, the at least one SL-based option may be used for each UE in an inactive state, and/or RACH may be configured to be used for each UE in an idle state. Alternatively, the at least one SL-based option may be used for each UE in an idle state, and/or RACH may be used for each UE in inactive state. In some embodiments, where the selected primary cell is different from the previous serving cell, and the UE is in an inactive state, the at least one SL-based option may be used instead of RACH procedure.

Furthermore, the at least one SL-based option may be used for each UE associated with at least one predetermined URLLC quality of service (QoS) class instead of, or in addition to, RACH procedure. In addition, the at least one SL-based option may be dynamically triggered by the serving network using at least one indication provided in, for example, at least one system information block (SIB) and/or common L1 signaling in PDCCH. At 309, the UE may transition to at least one connected state.

In 703, UE 730 may determine that UE 730 is operating in either the idle state or the inactive state and/or that UE 730 requires access to the serving network to transmit data to NE 740. For example, UE 730 may determine that UE 730 is operating in one of an idle state such as NR radio resource control (RRC) IDLE, or an inactive state such as NR RRC INACTIVE.

In addition, in response to the determined state and access requirement, UE 730 may select at least one received SL resource for initial access to NE 740. In some embodiments, the at least one selected SL resource may be selected based, at least, upon an amount and/or type of data required to be transmitted, and/or at least one quality of service (QoS) requirement associated with the data required to be transmitted. For example, UE 730 may be configured to select at least one received SL resource where URLLC data is to be transmitted. Alternatively or alternatively, UE 730 may be configured to select at least one RACH resource where MBB data is to be transmitted.

At 705, UE 730 may broadcast at least one uplink (UL) request for initial access over SL to at least NE 740 on the at least one selected SL resource, staring with sending SCI on PSCCH to schedule for at least one SL data packet sent on PSSCH at 707. The example illustrated in FIG. 7 shows that the at least one UL request may be received by at least one NE 750 on the at least one selected SL resource. In some embodiments, the at least one UL request may be in response to UE 730 determining that UE 730 is operating in one of an idle state or an inactive state.

Furthermore, the at least one UL request message may comprise SCI transmitted via PSCCH at 705 and, at 707, at least one SL data packet transmitted via PSSCH. The SCI transmitted via PSCCH may be a L1 control signaling configured to schedule the at least one SL data packet transmitted via PSSCH. The at least one SL data packet may comprise at least one extended initial access request transmitted as L2 and/or L3 signaling.

In certain embodiments, the at least one SL data packet as for the at least one extended initial access request may comprise one or more of at least one connection request, at least one buffer status report (BSR), and UE assistant information.

In some embodiments, the at least one UL request message may further comprise at least one UE identification (ID). For example, the at least one UE ID may be either a UE-generated, random UE ID if UE 730 is in RRC_IDLE, or a network-assigned inactive-radio network temporary identifier (I-RNTI) if the UE is in RRC_INACTIVE.

In certain embodiments, the length of the at least one I-RNTI may comprise a predetermined number of bits, such as 40-bits, as described by 3GPP TS 38.300. Additionally or alternatively, the at least one I-RNTI may comprise at least one UE-specific part, such as cell-RNTI (C-RNTI) which may also be applied for LTE, as described by 3GPP TS 36.300, and/or at least one RAN node-specific part, such as at least one ID of at least one current serving cell and/or at least one previous serving cell associated with an inactive UE state. In some embodiments, the at least one UE-generated, random UE ID may only be applied to the at least one UE-specific part, and/or the at least one RAN node-specific part may be based on at least one broadcast ID associated with at least one selected serving cell.

In some embodiments, the at least one UL request message may comprise at least one unique non-access stratum (NAS)-level ID, such as at least one globally unique temporary identifier (GUTI), at least one temporary mobile subscriber identity (TMSI), and/or at least one international mobile subscriber identity (IMSI), which may be configured to fit in the at least one UL request message. In various embodiments, the at least one UL request message may comprise a predetermined number of bits, such as 8 least significant bits (LSB) of at least one destination ID sent in SCI via PSCCH to schedule a SL transmission for the at least one destination ID of at least one receiving UE via PSSCH in general as described by 3GPP TS 36.300, which may not be used by the at least one SL transmission of the at least one UL request message. This is because the destination of the at least one UL request message may be the primary serving NE. Thus, the 8 LSB of the at least one destination ID may be replaced with other control information, such as at least part of the UE ID, as described above.

In certain embodiments, the at least one UL request message may further comprise at least one indication of the determined state of UE 730, such as idle state and/or inactive state. Additionally or alternatively, the at least one UL request message may comprise at least one indication of at least one ID of at least one primary serving cell selected by UE 730. For example, the at least one UL request message, when transmitted on at least one broadcast SL, may be received by multiple local base stations serving the massive IIoT system, wherein at least one SL resource may be coordinated between the multiple local base stations as part of that at least one preconfigured resource pool. As a result, this coordination may allow other than the selected primary serving cell in addition to the selected primary serving cell to receive the at least one UL request message broadcasted over SL and may forward the received at least one UL request message to the selected primary serving cell, as indicated in the at least one UL request message. This may improve the reliability and latency of the at least one UL request message. Depending on context awareness of the massive IIoT system being served, such as the number of UEs in different RRC states of the serving network, the serving network (via local BS or NE) may re-configure a proper SL resource pool for the SL-based option. SL resources may be in-band or out-of-band with regard to the serving Uu carrier. Both Tx and Rx pools for SL may be configured as cell or BS specific, for example, in case there is no coordination among local BSs. In this case, these pools may be the same and there may be no need to indicate the selected primary serving cell in the initial access request.

In contrast to transmitting the at least one UL request message based on enhanced SCI, as described above, transmitting the at least one UL request message comprising SCI and at least one SL data packet may enable transmission of additional information in the at least one UL request message without affecting the latency of the state transition. Additionally or alternatively, transmitting the at least one UL request message comprising SCI and at least one SL data packet may provide additional flexibility and/or efficiency inherited from the possibility of fully utilizing SL capability, as explained further below.

Furthermore, where the at least one UL request message comprises SCI and at least one SL data packet, the UE may transmit the at least one UL request message consisting of at least one actual application message (for example, small-data application) without requesting a state transition to RRC CONNECTED. This may be advantageous for data applications merely needing infrequent connections for transmitting considerable amount of data within the massive IIoT by eliminating the transmission of a connection request and the need of a connection setup each time the UE needs to transmit a small data from the idle state or the inactive state.

At 709, NE 750 may determine whether NE 750 is or is not a primary serving cell selected by UE 730 based upon at least one indication received with the at least one UL request for initial access. If NE 750 determines that NE 750 is not a primary serving cell selected by UE 730 based upon at least one indication received with the at least one UL request for initial access, at 711, NE 750 may transmit the at least one UL request message to NE 740 which is identified by NE 750 as the selected primary serving cell of UE 730 based upon at least one indication received with the at least one UL request for initial access.

At 713, NE 740 may determine whether contention occurs on the received UE ID on at least one SL, which may be based upon the at least one I-RNTI. Furthermore, upon determining that no contention occurs, NE 740 may schedule UE 730 on at least one PDCCH with the received UE ID, such as the at least one I-RNTI.

At 715 and 717, NE 740 may transmit at least one indication to UE 730. In some embodiments, the at least one indication may comprise downlink control information (DCI) via the at least one PDCCH (715) and/or, at 717, at least one connection setup message, such as RRC CONNECTION SETUP. Furthermore, the at least one indication may comprise at least one acknowledgement of small data, which may indicate to UE 730 that no state transition is required. At 719, NE 740 may receive at least one RRC ConnectionSetupComplete message and/or uplink data from UE 730 in response to the RRC Connection Setup. At 721, UE 730 may determine at least one state transition based upon the at least one received indication.

FIG. 8 illustrates an example of a system according to certain embodiments. In one embodiment, a system may include multiple devices, such as, for example, user equipment 810 and/or network entity 820.

User equipment 810 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

Network entity 820 may be one or more of a base station, such as an evolved node B (eNB) or 5G or New Radio node B (gNB), a serving gateway, a session management function (SME), a user plane function (UPF), a 5G NG-RAN node, a server, and/or any other access node or combination thereof. Furthermore, network entity 820 and/or user equipment 810 may be one or more of a citizens broadband radio service device (CBSD).

One or more of these devices may include at least one processor, respectively indicated as 811 and 821. Processors 811 and 821 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of devices indicated at 812 and 822. The memory may be fixed or removable. The memory may include computer program instructions or computer code contained therein. Memories 812 and 822 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

Processors 811 and 821 and memories 812 and 822 or a subset thereof, may be configured to provide means corresponding to the various blocks of FIGS. 1-7. Although not shown, the devices may also include positioning hardware, such as GPS or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 8, transceivers 813 and 823 may be provided, and one or more devices may also include at least one antenna, respectively illustrated as 814 and 824. The device may have many antennas, such as an array of antennas configured for multiple input multiple output (MIMO) communications, or multiple antennas for multiple radio access technologies. Other configurations of these devices, for example, may be provided. Transceivers 813 and 823 may be a transmitter, a receiver, or both a transmitter and a receiver, or a unit or device that may be configured both for transmission and reception.

The memory and the computer program instructions may be configured, with the processor for the particular device, to cause a hardware apparatus such as user equipment to perform any of the processes described below (see, for example, FIGS. 3-7). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 3-7. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Partial Glossary

3GPP 3rd Generation Partnership Project
ACK Acknowledgement
BS Base Station
BSR Buffer Status Report
C-RNTI Cell Radio Network Temporary Identifier
CR Change Request
CRID Customer Registration Identification
DCI Downlink Control Information
DL Downlink
DRX Discontinuous Reception
eMBB Enhanced Mobile Broadband
eNB Evolved Node B
EPS Evolved Packet System
gNB Next Generation Node B
GPS Global Positioning System
GUTI Globally Unique Temporary Identifier
HARQ Hybrid Automatic Repeat Request
ID Identification
IIoT Industrial Internet of Things
IoT Internet of Things
I-RNTI Inactive-Radio Network Temporary Identifier
LSB Least Significant Bit
LTE Long-Term Evolution
MAC Medium Access Control
MIoT Massive Internet of Things
MME Mobility Management Entity
NAS Non-Access Stratum
NBIoT Narrow Band Internet of Things
NR New Radio
OFDM Orthogonal Frequency-Division Multiplexing
PDCCH Physical Downlink Control Channel
PDU Protocol Data Unit
PRACH Physical Random Access Channel
PSCCH Physical Sidelink Control Channel
PSSCH Physical Sidelink Shared Channel
QoS Quality of Service
RACH Random Access Channel
RAN Radio Access Network
RAR Random Access Response
RLF Radio Link Failure
RNTI Radio Network Temporary Identifier
RRC Radio Resource Control
SCI Sidelink Control Information
SIB System Information Block
SL Sidelink
SMF Session Management Function
TR Technical Report
UE User Equipment
UL Uplink
URLLC Ultra-Reliable and Low-Latency Communication
WLAN Wireless Local Area Network

We claim:

1. An apparatus, comprising:
at least one processor; and
at least one memory including computer program code,
wherein the at least one memory and the computer program code are configured to, with the at least one processor, cause the apparatus at least to:
select at least one sidelink resource from at least one sidelink resource pool configured for initial access to at least one primary serving network entity;
transmit at least one uplink request message for initial access to the at least one primary serving network entity on the selected at least one sidelink resource; and
receive, in response to the at least one uplink request message, at least one indication from the primary serving network entity;
wherein the at least one uplink request message is used for each user equipment in an inactive state and at least one random access channel is configured for use for each user equipment in an idle state; and
wherein at least one random access channel resource is configured for the initial access where mobile broadband data is to be transmitted and the at least one uplink request message is configured for the initial access where high-reliability and low-latency data is to be transmitted.

2. The apparatus of claim 1, wherein the at least one memory and the computer program code are further configured to, with the at least one processor, cause the apparatus at least to:

receive at least one configuration comprising the at least one sidelink resource pool comprising the at least one sidelink resource configured for the initial access to the at least one primary serving network entity from an idle state or an inactive state from a serving network.

3. The apparatus of claim 2, wherein the at least one configuration of the at least one sidelink resource comprises at least one indication that whether the at least one sidelink resource is one or more of:

configured for at least one Industrial Internet of Things device; or configured for initial access associated with high-reliability and low-latency communication support or not.

4. The apparatus of claim 1, wherein the at least one memory and the computer program code are further configured to, with the at least one processor, cause the apparatus at least to:

determine that the apparatus is operating in either an idle state or an inactive state and requires access to a serving network to transmit data via the primary serving network entity of the serving network.

5. The apparatus of claim 1, wherein the at least one memory and the computer program code are further configured to, with the at least one processor, cause the apparatus at least to:

determine at least one state transition based upon the at least one received indication.

6. The apparatus of claim 1, wherein the at least one uplink request message is configured as enhanced sidelink control information broadcast over at least one sidelink on at least one physical sidelink control channel.

7. The apparatus of claim 1, wherein the at least one uplink request message is configured as a sidelink data packet broadcast over at least one sidelink on at least one physical sidelink shared channel.

8. The apparatus of claim 1, wherein the at least one uplink request message is configured for the initial access where the selected primary cell is different from previous serving cell and the user equipment is in an inactive state.

9. The apparatus of claim 1, wherein the selection of the at least one uplink request message for the initial access is based upon one or more of an amount of data required to be transmitted, at least one type of the data required to be transmitted, and at least one quality of service requirement associated with the data required to be transmitted.

10. An apparatus, comprising:
at least one processor; and
at least one memory including computer program code,
wherein the at least one memory and the computer program code are configured to, with the at least one processor, cause the apparatus at least to:
receive at least one uplink request message from at least one user equipment;
determine whether the at least one uplink request message is associated with at least one received user equipment identifier on at least one sidelink resource; and
transmit at least one indication to the at least one user equipment, and wherein the at least one indication comprises downlink control information via one or more of at least one physical downlink control channel and at least one connection setup message; and
wherein the at least one user equipment identification is configured to be one or more of user equipment-generated, random identifier if the at least one user equipment is in RRC_IDLE, and a network-assigned inactive-radio network temporary identifier if the at least one user equipment is in RRC_INACTIVE.

11. The apparatus of claim 10, wherein the at least one memory and the computer program code are further configured to, with the at least one processor, cause the apparatus at least to:

receive at least one radio resource control ConnectionSetupComplete message in response to the at least one indication comprising at least one connection setup message.

12. The apparatus of claim 10, wherein at least one uplink request message is configured as enhanced sidelink control information broadcast over at least one sidelink on at least one physical sidelink control channel.

13. The apparatus of claim 12, wherein the enhanced sidelink control information comprises at least one user equipment identification.

14. The apparatus of claim 10, wherein at least one uplink request message is configured as a sidelink data packet broadcast over at least one sidelink on at least one physical sidelink shared channel.

15. The apparatus of claim 10, wherein enhanced sidelink control information is within at least one size threshold.

* * * * *